(12) United States Patent
Choi

(10) Patent No.: US 7,867,134 B2
(45) Date of Patent: Jan. 11, 2011

(54) CONTROL METHOD FOR IMPROVING FUEL EFFICIENCY OF HYBRID ELECTRIC VEHICLE

(75) Inventor: Yong Kak Choi, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 612 days.

(21) Appl. No.: 12/005,796

(22) Filed: Dec. 28, 2007

(65) Prior Publication Data
US 2009/0105926 A1 Apr. 23, 2009

(30) Foreign Application Priority Data
Oct. 17, 2007 (KR) .................... 10-2007-0104262

(51) Int. Cl.
*B60W 10/06* (2006.01)
*B60W 10/08* (2006.01)
*B60W 10/10* (2006.01)
(52) U.S. Cl. .................... 477/3; 477/110; 903/930
(58) Field of Classification Search ................ 477/37; 903/930
See application file for complete search history.

(56) References Cited

U.S. PATENT DOCUMENTS

| 7,100,720 | B2 | 9/2006 | Ishikawa | |
|---|---|---|---|---|
| 2008/0234096 | A1* | 9/2008 | Joshi et al. | 477/3 |
| 2009/0118076 | A1* | 5/2009 | Heap et al. | 477/3 |

FOREIGN PATENT DOCUMENTS

| JP | 2002-221064 | 8/2002 |
|---|---|---|
| JP | 2005-198413 | 7/2005 |
| KR | 10-2005-0059957 A | 6/2005 |

* cited by examiner

*Primary Examiner*—Sherry L Estremsky
*Assistant Examiner*—Edwin A. Young
(74) *Attorney, Agent, or Firm*—Edwards Angell Palmer & Dodge LLP; Peter F. Corless

(57) ABSTRACT

The present invention provides a control method for a hybrid electric vehicle According to a control method of the present invention, the fuel efficiency is improved by extending a fuel cut operation in a wider transmission range and the impact caused by the extended fuel cut operation is reduced by reaction control of a motor operating in the opposite direction to engine torque.

6 Claims, 9 Drawing Sheets

CONTROL METHOD FOR IMPROVING FUEL EFFICIENCY OF HYBRID ELECTRIC VEHICLE

CROSS-REFERENCE TO RELATED APPLICATION

This application claims under 35 U.S.C. §119(a) on Korean Patent Application No. 10-2007-0104262, filed on Oct. 17, 2007, the entire contents of which are incorporated herein by reference.

BACKGROUND (a) Technical Field

The present invention relates to a control method for improving fuel efficiency of a hybrid electric vehicle. More particularly, the present invention relates to a method for controlling a fuel cut operation to be performed in a wider transmission region by a reaction control of a motor, thus improving fuel efficiency of a hybrid electric vehicle.

(b) Background Art

Intensive research has been underway to provide a high efficiency hybrid electric vehicle (HEV) by improving fuel efficiency and emission performance.

One of the various techniques for improving fuel efficiency and emission performance is to provide an HEV with idle stop system, in which the engine of the vehicle is stopped while the engine is idling as the vehicle is stopped.

Another technique for improving fuel efficiency and emission performance is to increase fuel cut operation. A fuel cut mode saves energy by stopping fuel injection when a vehicle running at a high speed is decelerated.

However, it has a problem of the fuel cut range being restricted. More specifically, a sudden change in engine torque can occur when the engine is restarted as the fuel is injected. When a torque is applied at a low speed, for example, at a low gear 1 or 2, the vehicle may be shaken due to the sudden change in engine torque.

For example, when the engine speed is lowered below about 1500 RPM, a fuel in (fuel re-injection) is performed. Although it is desirable to increase the fuel cut period for improvement of fuel efficiency, impact is brought about at the moment when the fuel cut operation is cancelled (i.e., rewetting is started). To improve fuel efficiency, it is necessary to prolong the fuel cut period at a lower speed and RPM.

In the event that a fuel cut operation is performed for an ordinary vehicle, the fuel cut operation is cancelled at about 1500 RPM to revive the engine. Converting the RPM into a vehicle speed, the fuel cut operation is cancelled at about 60 km/h (and 1500 RPM) in case of a vehicle not exceeding 2000 cc, although it may vary according to a gear ratio of the vehicle.

Accordingly, if the vehicle is running at 60 km/h or higher for a predetermined period of time, the fuel cut effecting condition is permitted. The fuel cut operation continues during deceleration period and is cancelled when a preset condition is met.

In detail, the fuel cut cancellation is made when it reaches a predetermined RPM with respect to coolant temperature, and a corrected RPM is considered thereto. Moreover, in the case where an air conditioner is turned on, an additional RPM is considered and, in the case where the air conditioner is turned off, the fuel cut cancellation is made at about 60 km/h and 1500 RPM.

HEVs developed so far reach about 1500 RPM at 60 km/h and the vehicle speed is decreased while maintaining about 1200 RPM up to about 15 km/h. With the current fuel cut logic for gasoline vehicles, it is thus impossible to improve fuel efficiency of HEVs. Moreover, a torque of about 15 to 25 Nm is suddenly applied during the fuel cut cancellation, which results in a serious impact that a driver can feel when the gear ratio is low.

The information disclosed in this Background section is only for enhancement of understanding of the background of the invention and should not be taken as an acknowledgement or any form of suggestion that this information forms the prior art that is already known to a person skilled in the art.

SUMMARY OF THE DISCLOSURE

Accordingly, the present invention has been made in an effort to solve the above-described drawbacks and one object of the present invention is to provide a control method that can perform a fuel cut operation in a wider transmission region and reduce an impact caused by a sudden change in the engine torque.

In one aspect, the present invention provides a control method for improving fuel efficiency of a hybrid electric vehicle comprising the steps of: (a) having an engine control unit prepare for a fuel cut operation by determining whether the fuel cut operation is available and, at the same time, having a hybrid control unit transmit a fuel cut enabling signal to the engine control unit which has completed the preparation of the fuel cut operation, thereby performing the fuel cut operation; (b) having the hybrid control unit determine whether a transmission gear ratio reaches a preset value of gear ratio and, if it reaches the preset value of gear ratio, transmit a fuel cut cancellation signal to the engine control unit, thereby cancel the fuel cut operation; (c) having the engine control unit receiving the fuel cut cancellation signal restart the engine; and (d) having the hybrid control unit perform a reaction control of a motor operating in the opposite direction to engine torque so that the torque being transmitted to a continuously variable transmission is input smoothly.

In preferred embodiments of the present invention, the control method is performed in view of various conditions such as brake pedal pressed/released and/or air conditioner on/off conditions.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

Other aspects of the invention are discussed infra.

DETAILED DESCRIPTION

Figure 1A:
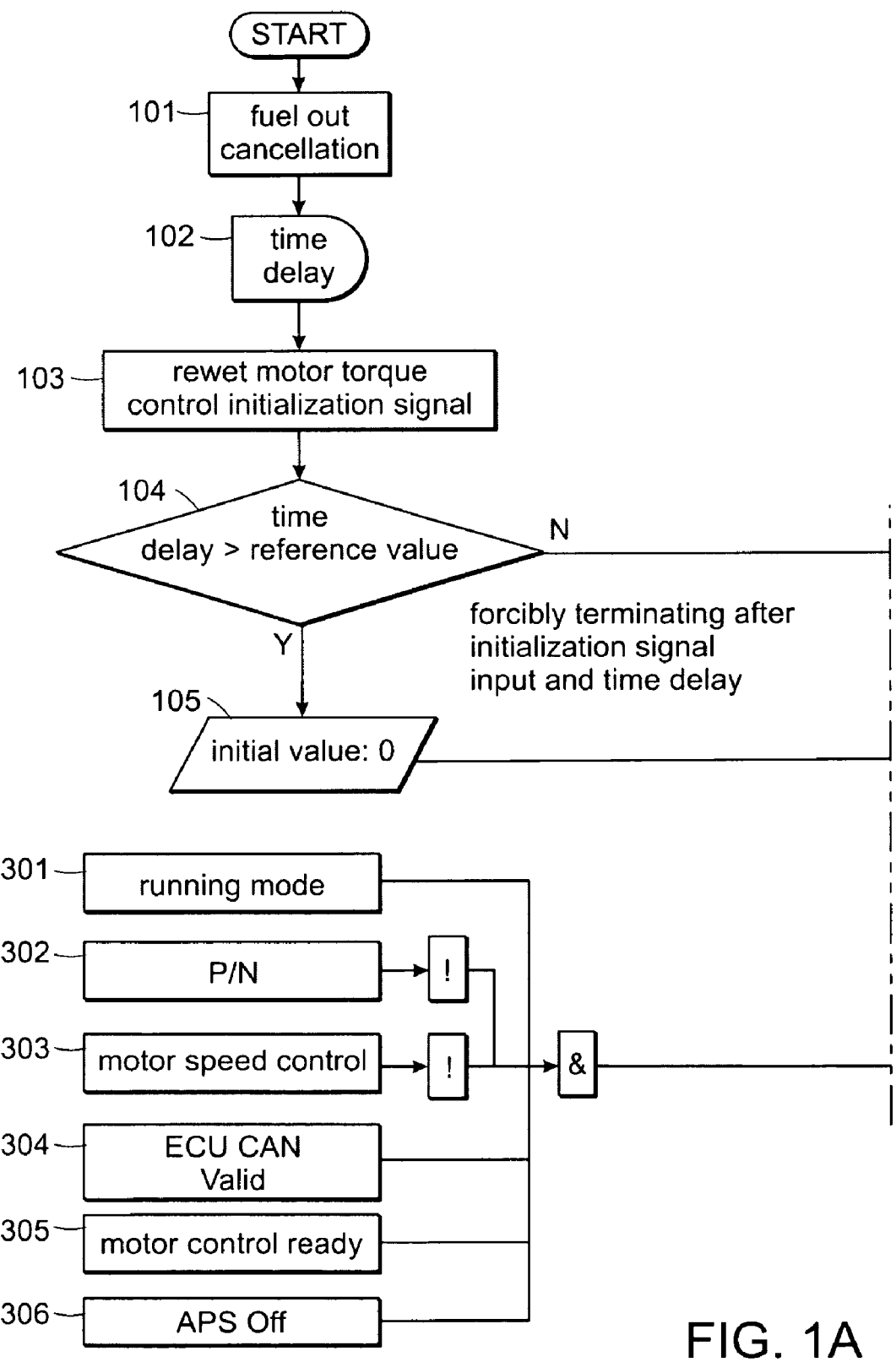
FIG. 1 is a flowchart showing a motor reaction torque control logic of a control method in accordance with a preferred embodiment of the present invention.

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Figure 1B:
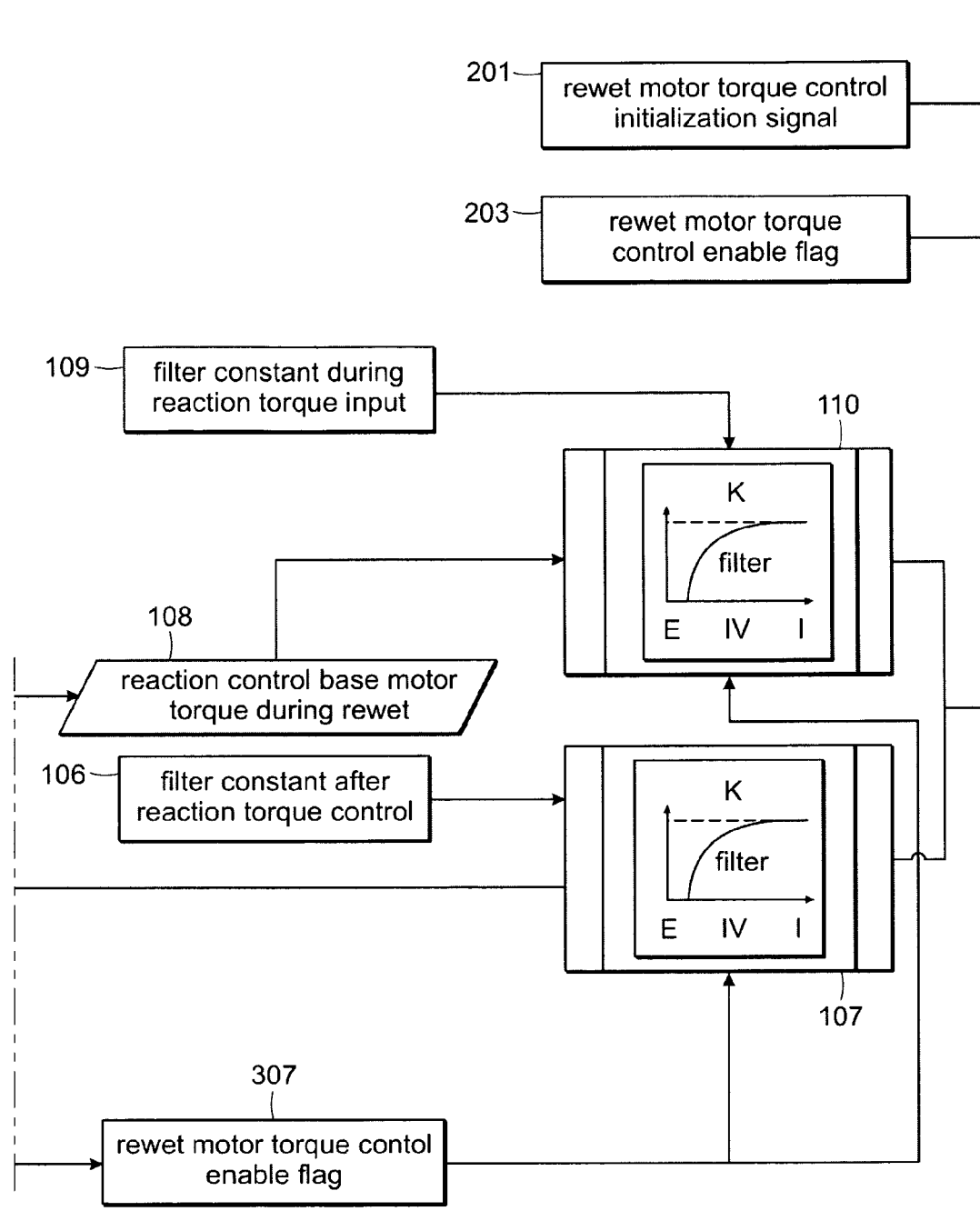
Figure 1C:
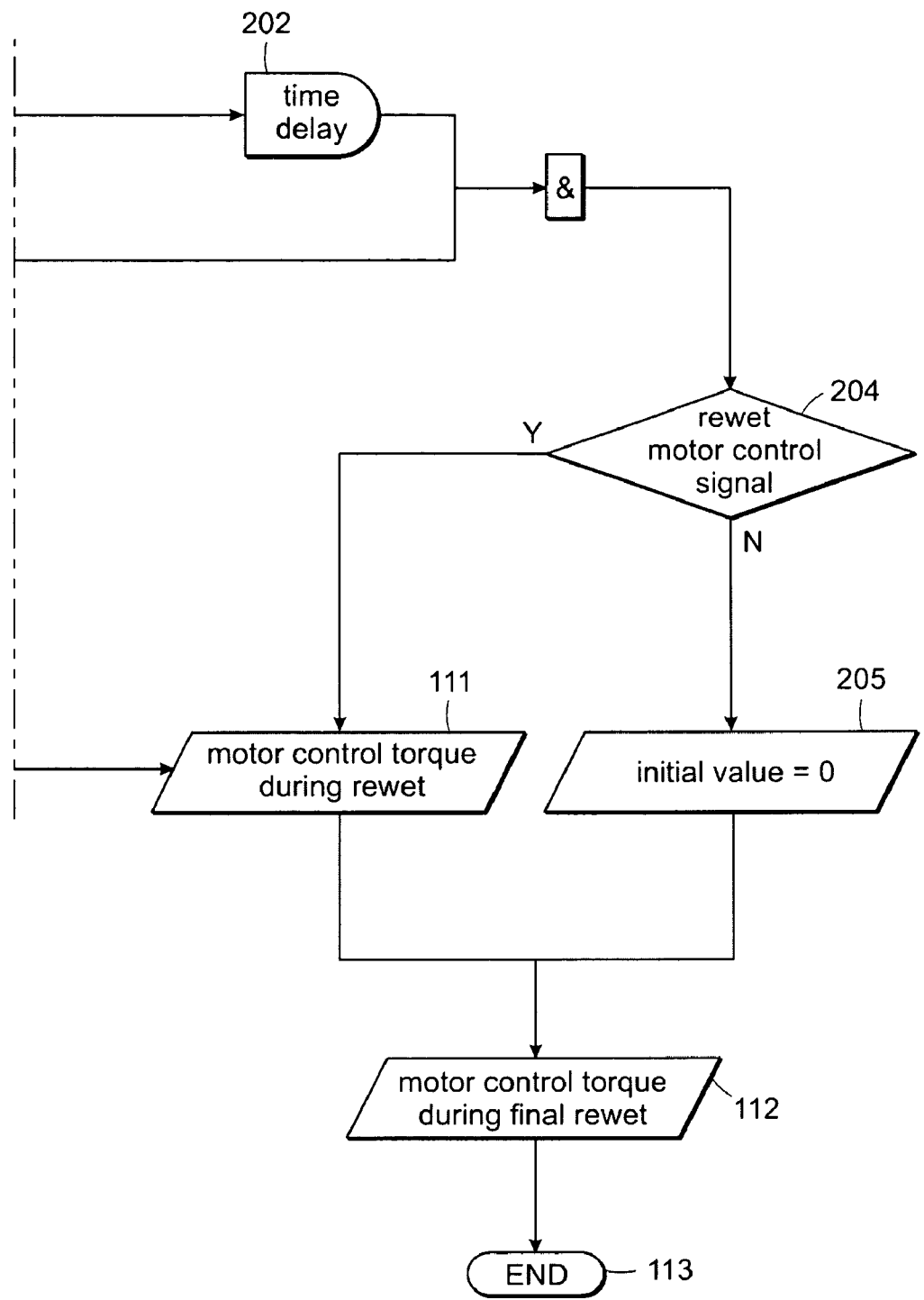
Figure 2:
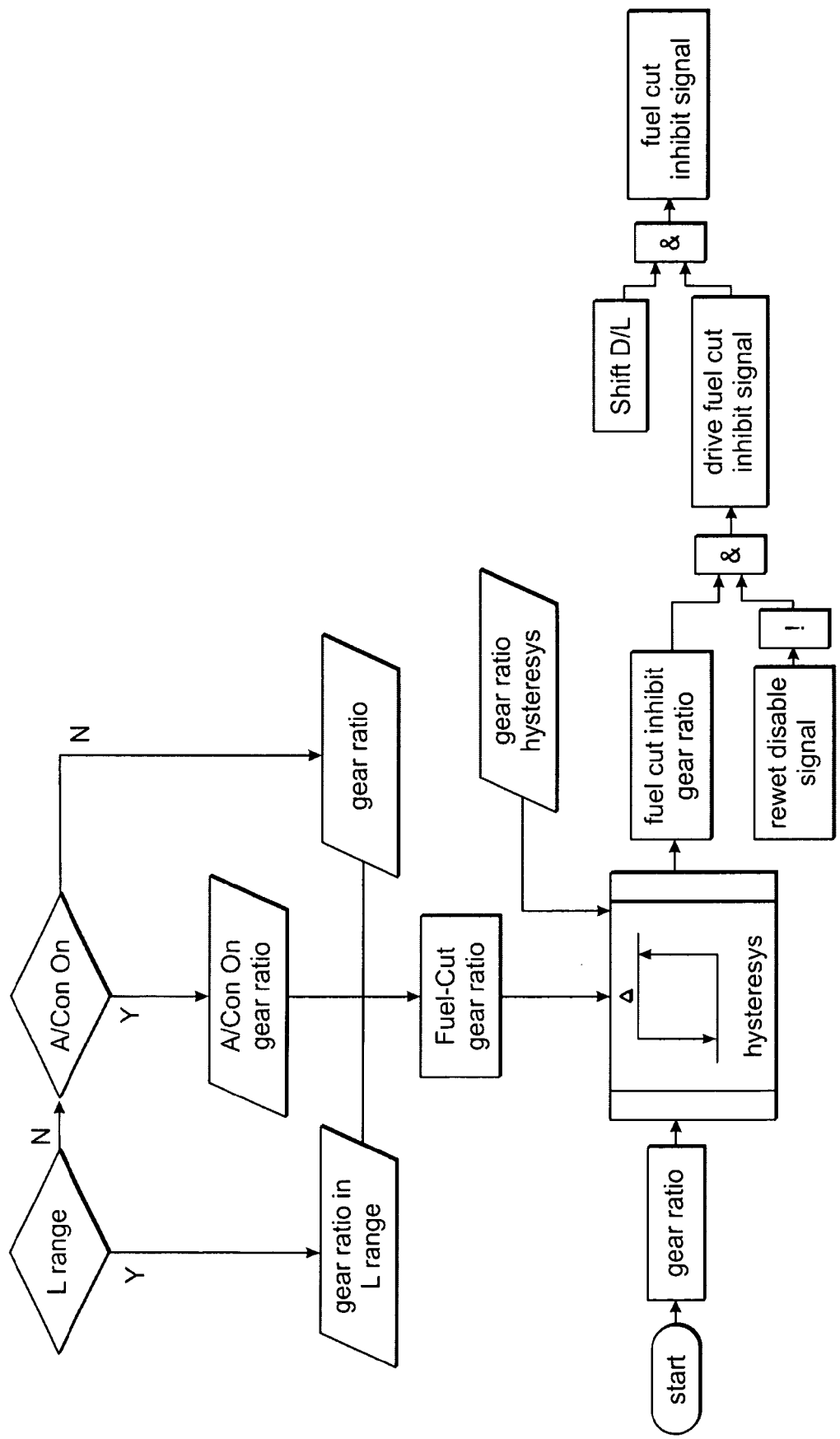
FIG. 2 is a flowchart showing a fuel cut control process with respect to a gear ratio of a control method in accordance with a preferred embodiment of the present invention.

FIG. 1 is a flowchart showing a motor reaction torque control logic of a control method in accordance with a preferred embodiment of the present invention, and FIG. 2 is a flowchart showing a fuel cut control process with respect to a gear ratio of a control method in accordance with a preferred embodiment of the present invention.

The control methods of the present invention include the steps of: performing a fuel cut operation after an engine enters a fuel cut state, canceling the fuel cut operation under a predetermined gear ratio condition after performing the fuel cut operation, restarting the engine simultaneously with the fuel cut cancellation, and reducing torque transmitted to a transmission by a reaction control of a motor during the restart of the engine. Preferably, during the fuel cut operation, fuel cut period can be prolonged according to a brake operating condition and an air conditioner operating condition and/or a gear ratio can be corrected according to an air conditioner load, for example.

The fuel cut operation is executed such that an engine control unit (ECU) prepares for the fuel cut operation by determining whether or not the fuel cut of the engine is available and, at the same time, a hybrid control unit (HCU) transmits a fuel cut enabling signal (flag) to the ECU that has completed the preparation of the fuel cut operation.

The fuel cut cancellation is determined by a transmission gear ratio of the vehicle, i.e., by a correlation between the vehicle speed and the engine RPM. If the gear ratio reaches a preset gear ratio control value, a fuel cut cancellation signal is transmitted to the ECU to cancel the fuel cut operation and, at the same time, the engine is restarted by the ECU.

Simultaneously with the engine restart, the HCU performs a reaction control of a motor operating in the opposite direction to engine torque so that the torque being transmitted to a continuously variable transmission (CVT) is input as smoothly as possible.

The motor reaction control process will be described with reference to FIG. 1 below.

If a motor reaction control flag is input, the torque is filtered from the motor reaction control torque "0" to a predetermined maximum torque of the reaction control (generally, the maximum drag torque of the engine is input) such that the torque is increased for a predetermined reference period of time.

At this time, the size of the increased torque and the shape of the torque filtering may be formed opposite to those generated when the engine torque is increased. After the maximum reaction torque is generated for a predetermined period of time, the torque is decreased slowly to the initial value "0" to terminate the motor reaction control.

In more detail, a fuel cell cancellation signal is input in step 101, a predetermined time is delayed in step 102, a rewet motor torque control initialization signal is input in step 103, and a timer operates in step 104.

During the operation of the timer in step 104, a base motor torque of reaction control for rewet process is output in step 108 (generally, the maximum drag torque of the engine is set), and the output torque is adjusted by a filtering operation in step 109.

While a rewet motor control signal is input in step 204, a rewet motor control torque is output in step 111, and a final rewet motor control torque is output in step 112, thus terminating the reaction control.

If the timer operation is completed in step 104, the initialization value "0" is output in step 105, and the reaction torque is slowly decreased by a filtering operation in step 107.

The rewet motor control signal of step 204 is output when the rewet motor torque control initialization signal is input in step 201, undergoes a time delay in step 202, and input together with a rewet motor torque control enabling signal of step 203. A torque value "0" is output before the rewet motor control signal of step 204 is input.

FIG. 2 is a flowchart showing a fuel cut control process with respect to a gear ratio of the vehicle and will be described in detail below.

The gear ratio is in the range of 0.443 to 2.416. The below described gear ratios are data for a better understanding.

In the event that the air conditioner is turned off, a gear selector is in the D position and the brake pedal is not pressed, a fuel cut inhibit reference gear ratio is 0.7 as a value of step 505 is input, and a hysteresis is 0.1 as a value of step 507 is input. That is, if the gear ratio is smaller than 0.7, it is possible to effect the fuel cut operation. Even if the fuel cut operation is performed as the gear ratio is smaller than 0.7, the fuel cut operation is forcibly cancelled if the gear ratio becomes greater than 0.8.

In the event that the air conditioner is turned on, the fuel cut reference gear ratio is 0.6 in consideration of the air conditioner torque as a value of step 504 is input after the determination of step 503, and the hysteresis is 0.1 as a value of step 507 is input. That is, only if the gear ratio is smaller than 0.6, it is possible to effect the fuel cut operation and, if the gear ratio is greater than 0.7, the fuel cut operation is inevitably cancelled.

In case of the L range, the fuel cut reference gear ratio becomes lower. A gear ratio of step 502 is input after the determination of step 501, and the value of step 507 is input as the gear ratio hysteresis. Accordingly, the time to perform the fuel cut operation is shortened.

As above, if the gear ratios that can effect the fuel cut operation under the air conditioner on/off conditions and under the L range condition are determined, a value of step 403 is determined, and a fuel cut inhibit signal of step 405 is determined except for a situation where there is a rewet disabling signal in step 404. In this case, the gear conditions are restricted to the D range and L range. Through the above control process, a fuel cut inhibit signal of final step 407 is determined.

Next, a method for extending the fuel cut operation after performing the fuel cut operation will be described in more detail below.

An object of the present invention, as discussed above, is to increase the fuel cut period for improving fuel efficiency and reduce the impact caused by the increase in the fuel cut period. Under the condition where the brake pedal is pressed and the air conditioner is turned off, a preferred embodiment of the present invention controls the vehicle so as to perform the idle stop and the final stop using the motor, not turning on the engine in the event that the vehicle speed is reduced to a fuel cut state and further the vehicle stop and the idle stop are made and perform the reaction control of the motor in the event that the brake pedal is released to accelerate or adjust the vehicle speed.

Increasing the fuel cut period and reducing the impact caused by the increased fuel cut period can be attained and maximized by designing an appropriate control logic according to a deceleration condition in which the brake pedal is not pressed, which is called a coating condition, a deceleration condition in which the brake pedal is pressed, and air conditioner on/off conditions.

In the present invention, control processes for extending the fuel cut period are performed under the following conditions: where a vehicle is decelerated with the brake pedal not pressed and an air conditioner is turned off; where a vehicle is decelerated with the brake pedal not pressed and an air conditioner is turned on; where a vehicle is decelerated with the brake pedal pressed and an air conditioner is turned off; where a vehicle is decelerated with the brake pedal pressed and an air conditioner is turned on.

Figure 3:
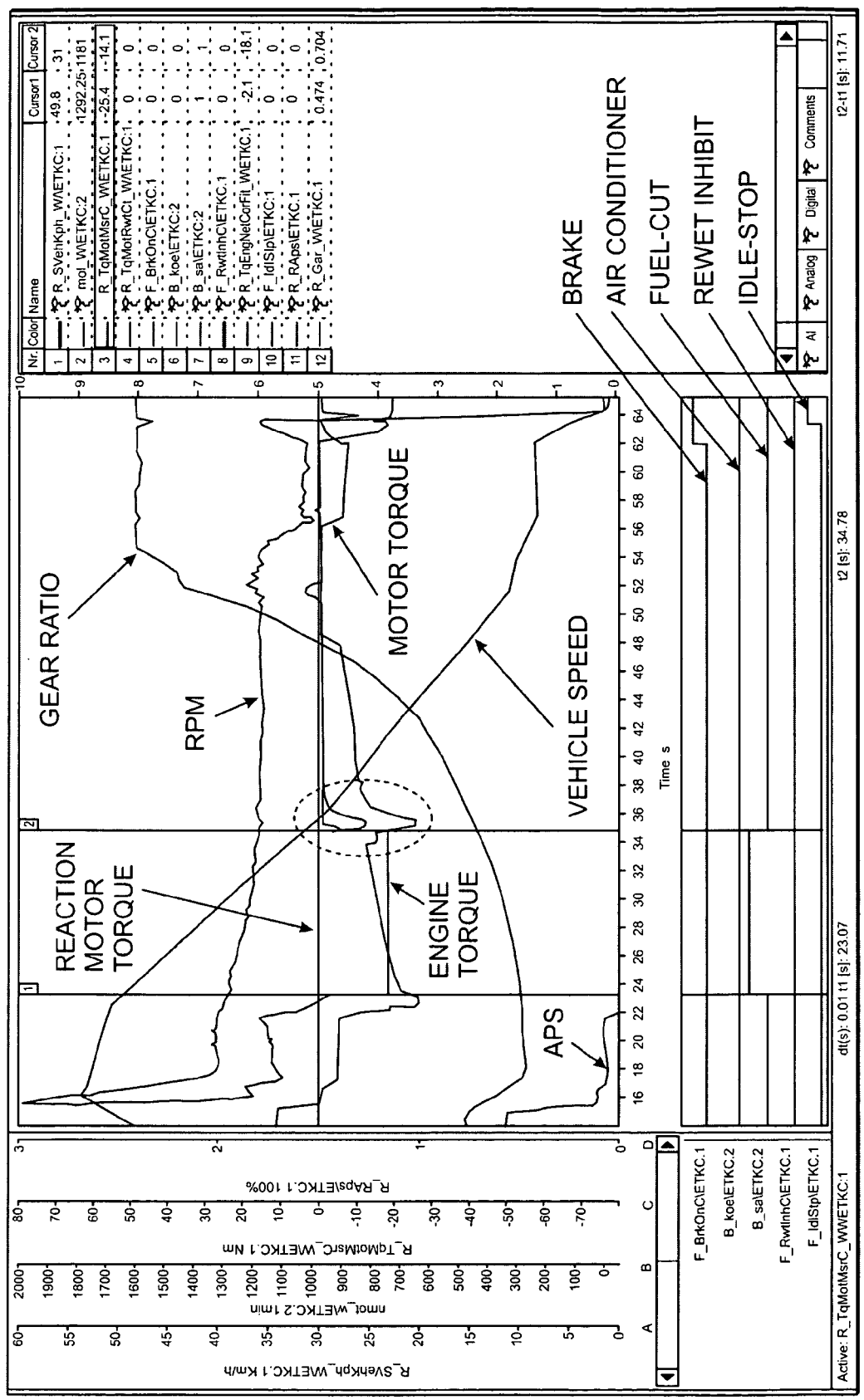
FIG. 3 is a graph showing a control process under brake-off and air conditioner-off condition of a control method in accordance with a preferred embodiment of the present invention.

FIG. 3 is a graph showing a control process for extending the fuel cut period under the condition where a vehicle is decelerated with the brake pedal not pressed (i.e., coasting) and an air conditioner is turned off.

The fuel cut operation is extended to a point where a gear ratio reaches a predetermined gear ratio. When the fuel cut operation is cancelled, the impact generated by the fuel cut extension is reduced by the motor reaction control so that the driver cannot feel the impact.

If the accelerator pedal is operated during the fuel cut operation, the fuel cut operation is immediately cancelled and the acceleration proceeds. At this time, the motor reaction control is not performed.

In more detail, the fuel cut period is extended up to a point where there is no impact. Here, as the accelerator pedal is released, the engine performs a dash-pot function so as to reduce the engine torque change as smoothly as possible.

At this time, the ECU prepares for the fuel cut operation by determining whether or not the fuel cut of the engine is available and, at the same time, the HCU transmits a fuel cut enabling signal to the ECU which has completed the preparation of the fuel cut operation, thus performing the fuel cut operation.

The HCU determines the cancellation of the fuel cut operation using a predetermined control value (threshold) set as a gear ratio. If the transmission gear ratio of the vehicle reaches a predetermined gear ratio, i.e., the predetermined control value, the HCU transmits a fuel cut cancellation signal to the ECU.

The ECU receiving the fuel cut cancellation signal performs rewet and fuel re-injection (fuel in) operations to restart the engine. The rewet refers to a process of rewetting the outer wall of the cylinder with fuel to be in a normal state, since the outer wall of the cylinder is dried during the fuel cut operation, and the amount of fuel re-injection is determined in view of the rewet.

Simultaneously with the rewet operation, the HCU performs the reaction control of the motor operated in the opposite direction to the engine torque so that the torque transmitted to the CVT is input as smoothly as possible so that the driver cannot feel the sudden change in the torque.

Figure 4:
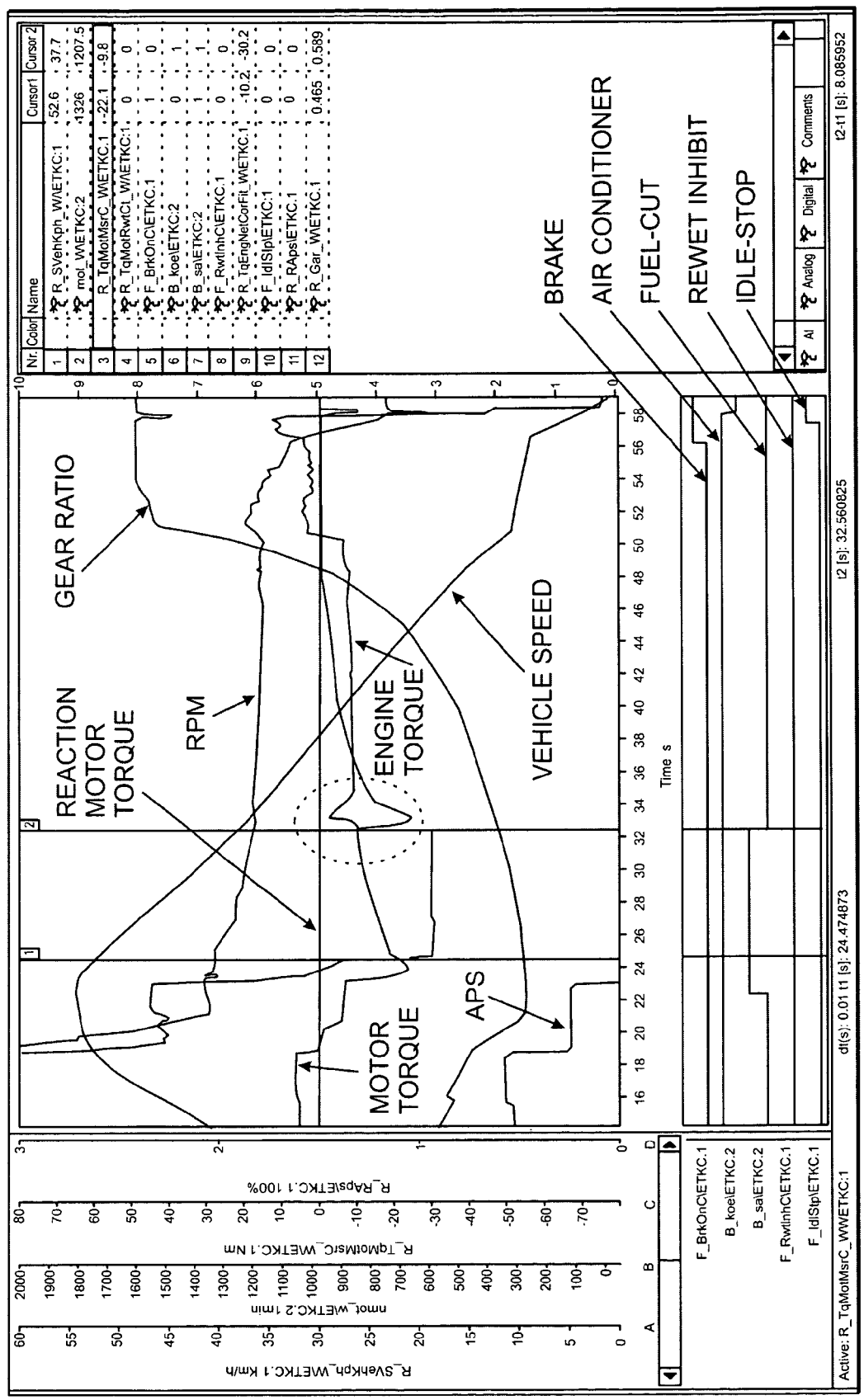
FIG. 4 is a graph showing a control process under brake-off and air conditioner-on condition of a control method in accordance with a preferred embodiment of the present invention.

FIG. 4 is a graph showing a control process for extending the fuel cut period to a predetermined gear ratio under the condition where a vehicle is decelerated with the brake pedal not pressed and an air conditioner is turned on.

The control process for extending the fuel cut period is performed in the manner same as the above-described process except that a gear ratio is corrected in view of the air conditioner load.

That is, the fuel cut cancellation is determined by a predetermined control value set as a gear ratio and, if the transmission gear ratio of the vehicle reaches the control value, the HCU transmits a fuel cut cancellation signal to the ECU. In this case, since the air conditioner is turned on, a correction value for the gear ratio control value is additionally input to control the impact.

An example of correcting the gear ratio for correcting the air conditioner load will be described with reference to FIG. 2. Under the condition where the air conditioner is turned on in the D range, the fuel cut reference gear ratio may be set to 0.6 as a value of step 505 is input after the determination of step 503, and the hysteresis may be set to 0.1 that is a value of step 507. That is, if the gear ratio is smaller than 0.6, it is possible to perform the fuel cut operation and, if the gear ratio is greater than 0.7, the fuel cut operation is inevitably cancelled.

As a result, the ECU receiving the fuel cut cancellation signal performs the rewet and fuel re-injection (fuel in) operations to restart the engine. Simultaneously with the engine restart (engine rewet), the HCU performs the reaction control of the motor operated in the opposite direction to the engine torque so that the torque transmitted to the CVT is input as smoothly as possible so that the driver cannot feel the sudden change in the torque.

Figure 5:
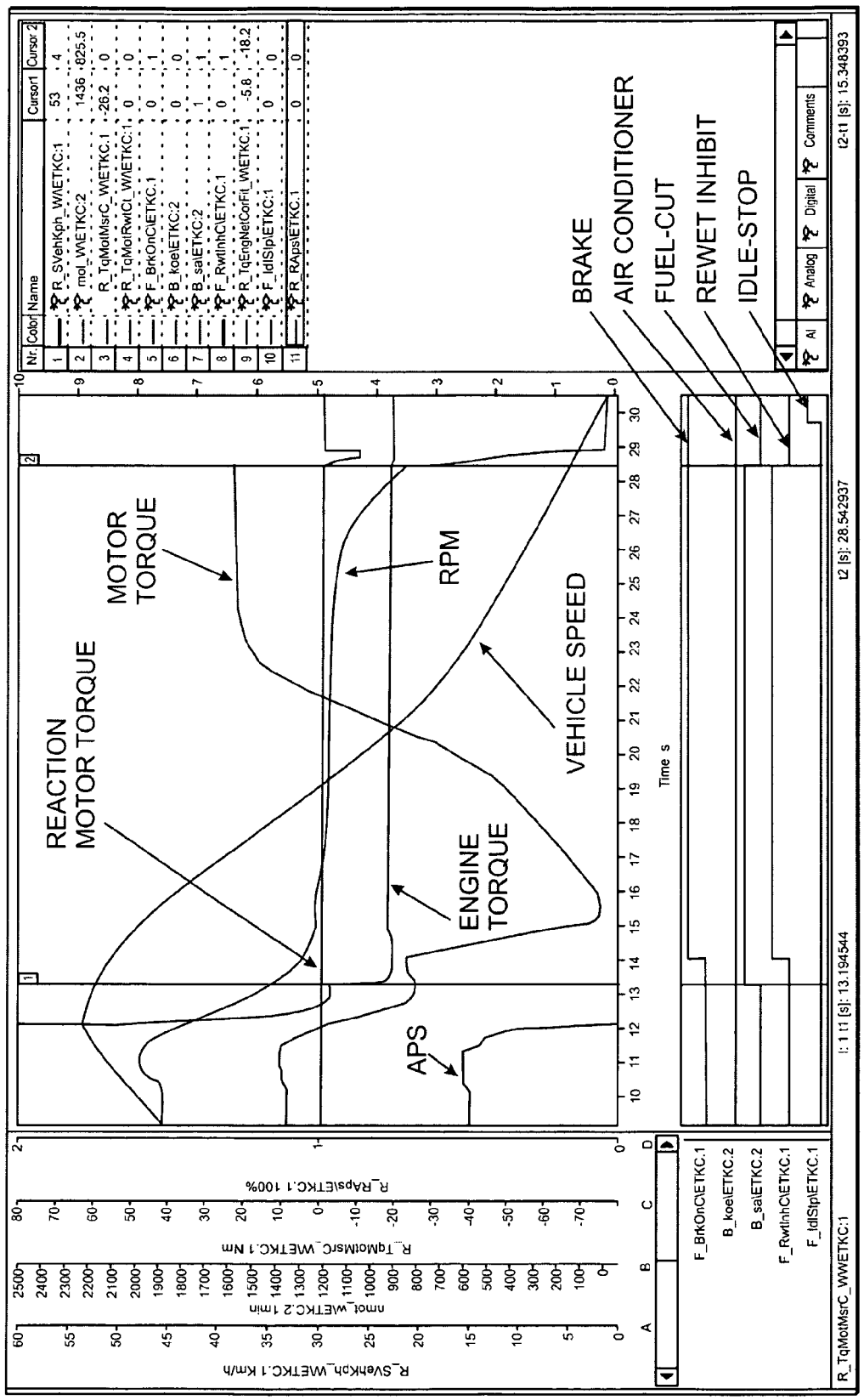
FIG. 5 is a graph showing a control process under continued brake-on condition of a control method in accordance with a preferred embodiment of the present invention.
Figure 6:
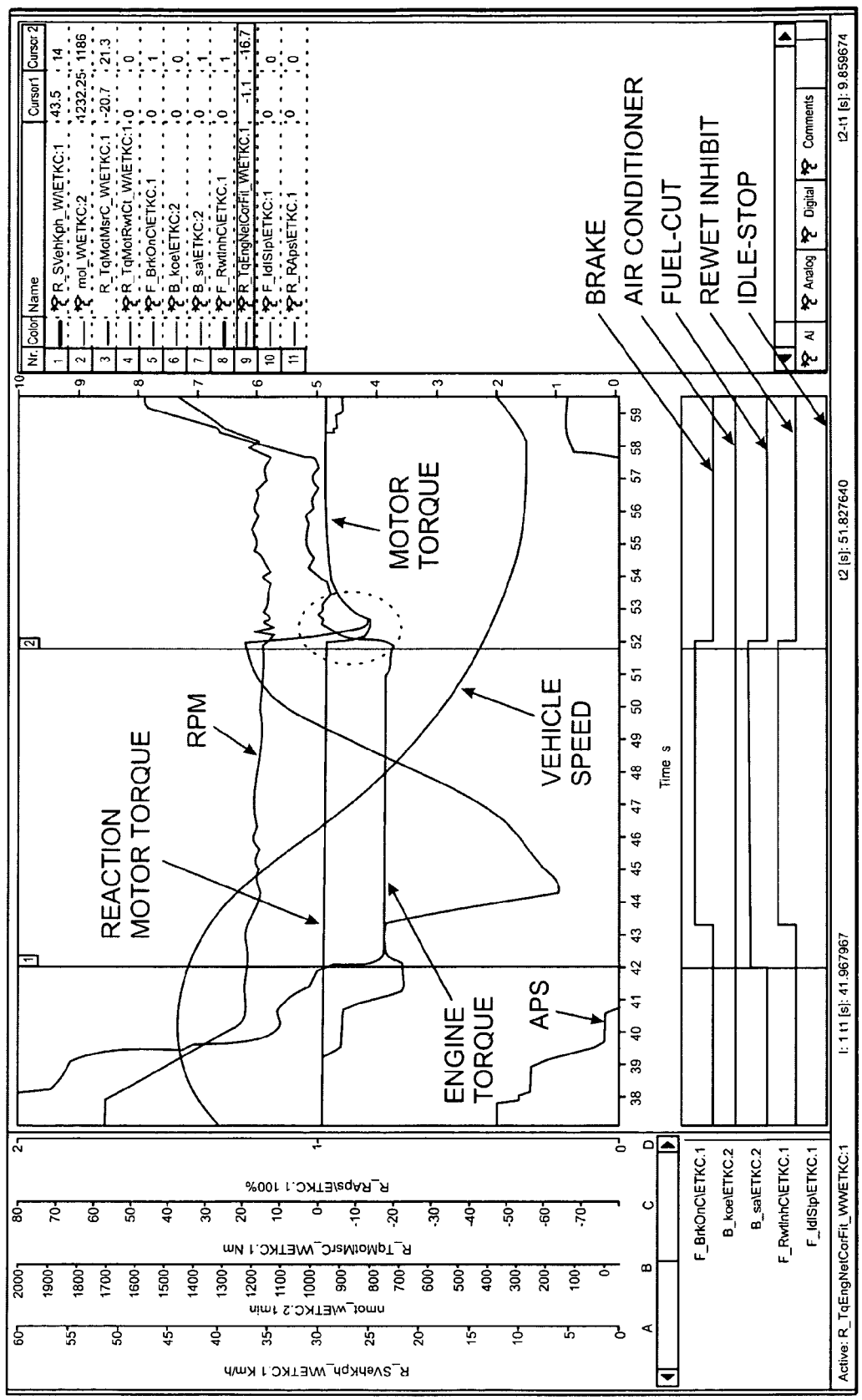
FIG. 6 is a graph showing a control process under brake-on and subsequent brake-off conditions of a control method in accordance with a preferred embodiment of the present invention.

FIG. 5 shows a control process performed under the condition where the brake pedal is pressed continuously, in which the fuel cut operation is extended to the end to maximize the improvement of fuel efficiency and a fuel cut inhibit signal is used to extend the fuel cut operation to the idle stop. FIG. 6 shows a control process performed under the condition where the brake pedal is released halfway, in which the fuel cut inhibit signal is cancelled and the motor reaction control is performed to lessen the impact generated when the engine is restarted (rewet), thus ensuring the driving performance.

Under the condition where a vehicle is decelerated with the brake pedal pressed and an air conditioner is turned off, the fuel cut operation is extended until the vehicle is stopped.

In this case, after performing the fuel cut operation, the HCU transmits a fuel cut cancellation (engine restart) inhibit request signal to the ECU to extend the fuel cut operation. At this time, the load of the engine drag generated when the engine is turned off is boosted by the motor to perform the idle stop. During the fuel cut cancellation (engine rewet and restart), the impact is reduced by the motor reaction control to lessen the impact generated by the extension of the fuel cut operation.

In more detail, in the event that the vehicle speed is reduced with the brake pedal pressed, a regenerative braking operation is performed.

There is a large difference between the amount of regenerative braking under the deceleration condition where the brake pedal is not pressed and the amount of regenerative braking under the deceleration condition where the brake pedal is pressed. Mostly, the amount of regenerative braking in the case where the brake pedal is pressed is controlled to be about one to four times to ensure sufficient braking force compared with the case where the brake pedal is not pressed.

The engine torque is smoothly controlled and reduced by the dash-pot. At this time, the ECU prepares for the fuel cut operation by determining whether or not the fuel cut is available and, at the same time, the HCU transmits a fuel cut enabling signal to the ECU which has completed the preparation of the fuel cut operation, thus performing the fuel cut operation.

In the case where the brake pedal is pressed until the vehicle is stopped, the fuel cut operation is not cancelled, which is called a rewet inhibit condition. That is, the deceleration rate and the load condition (drag) of the vehicle are maintained up to the idle stop. At this time, a torque equal to the engine load is transmitted by the boosting control of the motor to maintain the torque input to the CVT constant.

If the brake pedal is released to accelerate or adjust the vehicle speed before the vehicle is stopped, the fuel cut operation is immediately cancelled to perform the rewet operation. At this time, the gear ratio is low and thus the motor torque reaction control is required.

The engine is restarted simultaneously with the fuel cut cancellation and to be in an idling state capable of reaccelerating the vehicle. After this, if the vehicle speed is reduced by the depression of the brake pedal, the rewet engine is in the idling state and, if it reaches a vehicle speed capable of executing the idle stop, it performs the idle stop through the motor control.

Figure 7:
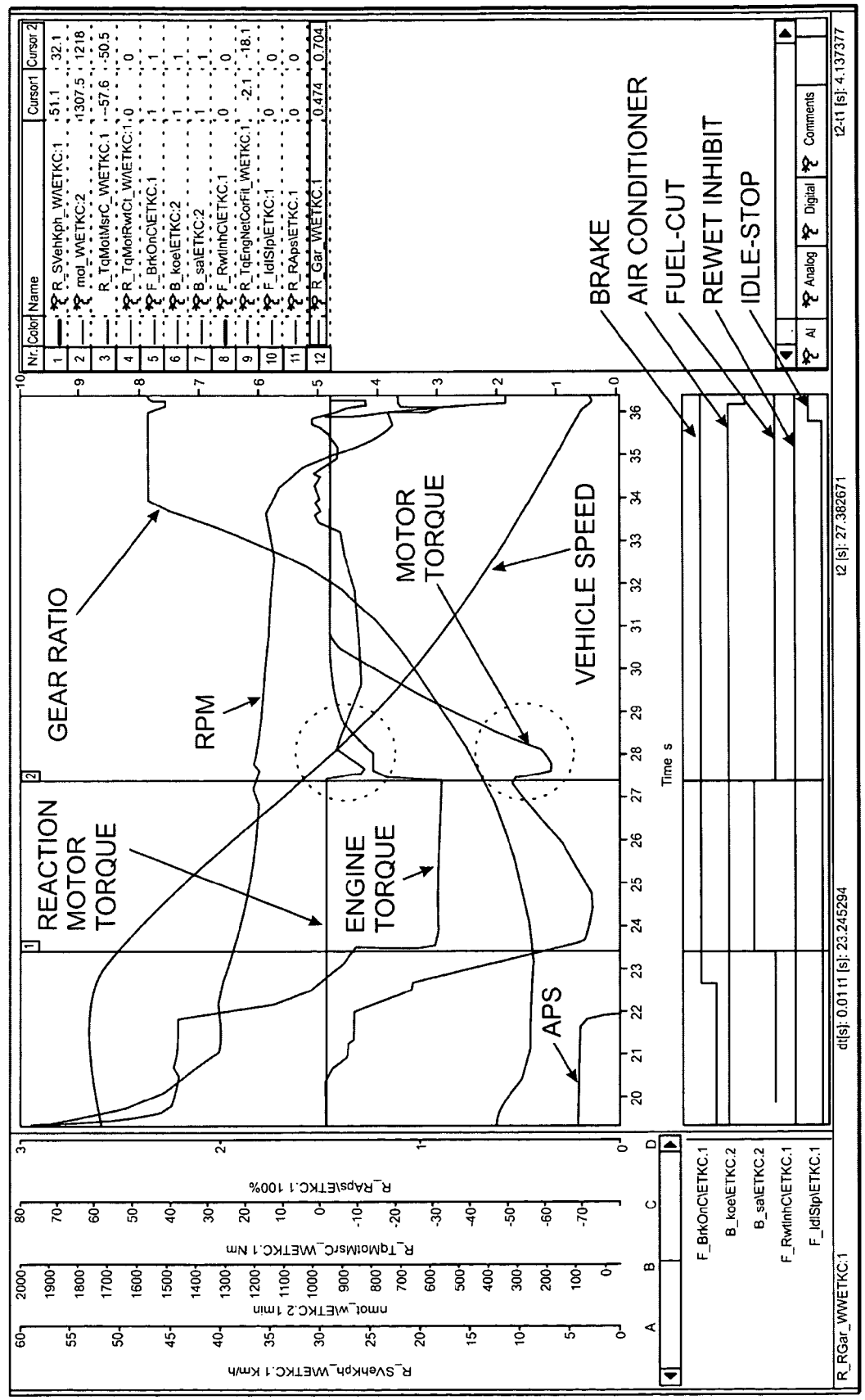
FIG. 7 is a graph showing a control process under brake-on and air conditioner-on condition of a control method in accordance with a preferred embodiment of the present invention.

Next, FIG. 7 shows a control process for extending the fuel cut period to a predetermined gear ratio under the condition where a vehicle is decelerated with the brake pedal pressed and an air conditioner is turned on.

The control process for extending the fuel cut period is performed in the same manner as the above-described process except that a gear ratio is corrected in view of the air conditioner load.

In more detail, in the event that the vehicle is decelerated with the brake pedal pressed, a regenerative braking operation is performed. And, if the air conditioner is turned on, since the load according to the air conditioner is added, the amount of regenerative braking is controlled so that the driver cannot recognize the change in the braking amount according to the air conditioner on/off.

The engine torque is smoothly controlled and reduced by the dash-pot. At this time, the ECU prepares for the fuel cut operation by determining whether or not the fuel cut is available and, at the same time, the HCU transmits a fuel cut enabling signal to the ECU which has completed the preparation of the fuel cut operation, thus performing the fuel cut operation.

The fuel cut cancellation is determined by a predetermined control value set as a gear ratio and, if the transmission gear ratio of the vehicle reaches the control value, the HCU transmits a fuel cut cancellation signal to the ECU. Moreover, since the air conditioner is turned on, a correction value for the gear ratio control value is additionally input to control the impact.

As a result, the ECU receiving the fuel cut cancellation signal performs the rewet and fuel re-injection (fuel in) operations to restart the engine. Simultaneously with the engine restart (engine rewet), the HCU performs the reaction control of the motor operated in the opposite direction to the engine torque so that the torque transmitted to the CVT is input as smoothly as possible, and thus the driver cannot feel the sudden change in the torque.

In the event that the vehicle is decelerated with the brake pedal pressed and the air conditioner is turned on, the rewefted engine is in the idling state and, if it reaches a vehicle speed capable of executing the idle stop, it performs the idle stop through the motor control.

As discussed above, according to the present invention, it is possible to ensure a wider fuel cut period and reduce the impact generated by the extended fuel cut operation.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A control method for improving fuel efficiency of a hybrid electric vehicle comprising the steps of:
    (a) having an engine control unit prepare for a fuel cut operation by determining whether the fuel cut operation is available and, at the same time, having a hybrid control unit transmit a fuel cut enabling signal to the engine control unit which has completed the preparation of the fuel cut operation, thereby performing the fuel cut operation;
    (b) having the hybrid control unit determine whether a transmission gear ratio reaches a preset value of gear ratio and, if it reaches the preset value of gear ratio, transmit a fuel cut cancellation signal to the engine control unit, thereby cancel the fuel cut operation;
    (c) having the engine control unit receiving the fuel cut cancellation signal restart the engine; and
    (d) having the hybrid control unit perform a reaction control of a motor operating in the opposite direction to engine torque so that the torque being transmitted to a continuously variable transmission is input smoothly.

2. The control method of claim 1, wherein, in the step (a), if the vehicle is decelerated with a brake pedal not pressed and an air conditioner is turned off, the fuel cut operation continues until a preset gear ratio condition is met.

3. The control method of claim 1, wherein, in the step (a), if the vehicle is decelerated with a brake pedal not pressed and an air conditioner is turned on, the fuel cut operation continues until a preset gear ratio condition is met, and a gear ratio is corrected in view of load of the air conditioner.

4. The control method of claim 1, wherein, in the step (a), if the vehicle is decelerated with a brake pedal pressed and an air conditioner is turned off, the fuel cut operation continues until the vehicle is stopped.

5. The control method of claim 4, wherein if the vehicle is decelerated with a brake pedal pressed and an air conditioner is turned off, engine drag generated when the engine is turned off during vehicle stop is boosted by the motor to perform an idle stop.

6. The control method of claim 1, wherein, in the step (a), if the vehicle is decelerated with a brake pedal pressed and an air conditioner is turned on, the fuel cut operation continues until the vehicle is stopped, and a gear ratio is corrected in view of load of the air conditioner.

* * * * *